S. E. HOLT.
COFFEE STRAINER.
APPLICATION FILED JUNE 15, 1918.
1,317,447.
Patented Sept. 30, 1919.
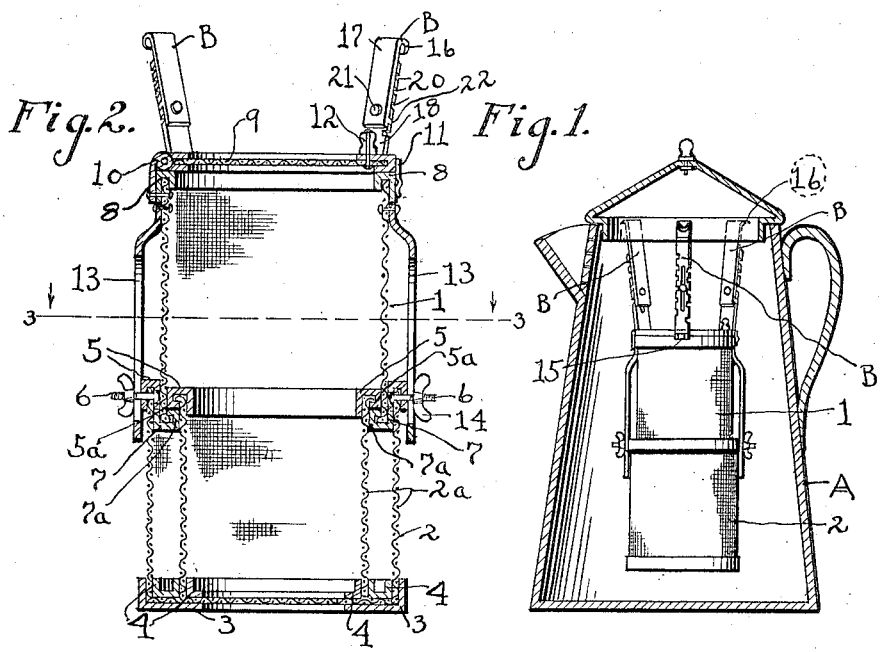
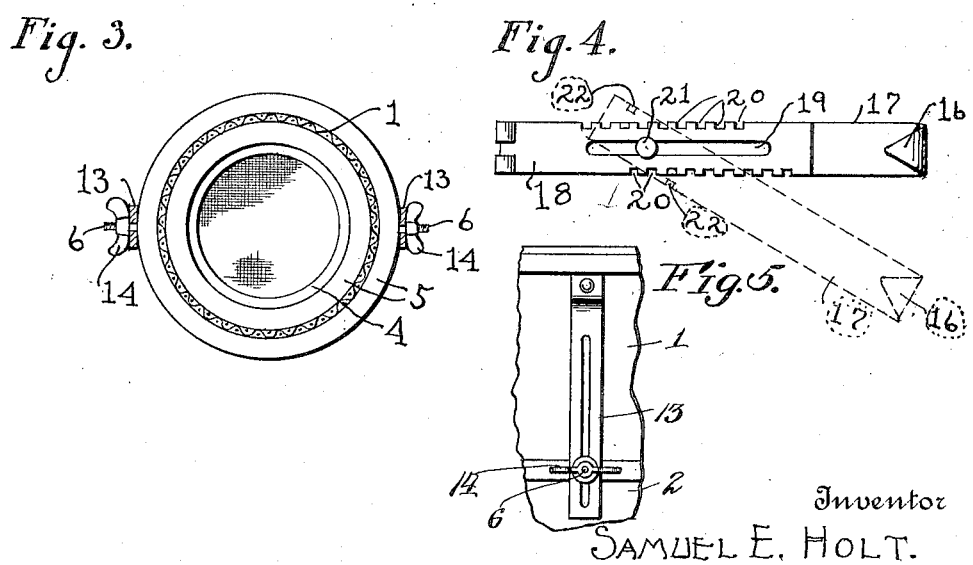
Inventor
SAMUEL E. HOLT.
By  H. S. Hill
Attorney

UNITED STATES PATENT OFFICE.

SAMUEL EDWIN HOLT, OF BERNALILLO, NEW MEXICO.

COFFEE-STRAINER.

1,317,447.  Specification of Letters Patent.  Patented Sept. 30, 1919.

Application filed June 15, 1918. Serial No. 240,136.

*To all whom it may concern:*

Be it known that I, SAMUEL EDWIN HOLT, a citizen of the United States, residing at Bernalillo, in the county of Sandoval, State of New Mexico, have invented a new and useful Coffee-Strainer; and I do hereby declare the following to be a full, clear, and exact description of the invention, such as will enable others skilled in the art to which it appertains to make and use the same.

The present invention relates to a coffee strainer, and has for its object to provide a device of this character which embodies novel features of construction whereby it can be readily mounted in operative position within any ordinary coffee pot and will receive and confine the coffee in such a manner as to prevent the grounds from becoming mixed with the liquid coffee, thereby enabling clear coffee to be poured from the pot at any time, even though it may be necessary to keep the coffee pot on the stove all day.

Further objects of the invention are to provide a device of this kind which is adjustable to receive different amounts of coffee and to fit different sizes and shapes of coffee pots, which effectively confines the grounds and prevents them from mingling with the water, and which can be quickly removed from the coffee pot and thoroughly cleansed at any time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a sectional view through a coffee pot provided with a strainer constructed in accordance with the invention.

Fig. 2 is an enlarged vertical sectional view through the strainer, showing the same as detached.

Fig. 3 is a horizontal sectional view through the strainer, taken on the line 3—3 of Fig. 2.

Fig. 4 is a detail view of one of the adjustable suspending hooks.

Fig. 5 is a detail view of a slotted side bar used for supporting the device.

Corresponding and like parts are referred to in the following description and indicated in all the views of the drawings by the same reference characters.

Referring to the drawings, which illustrate one embodiment of the invention, the reference character A designates a coffee pot which is of the conventional construction, and within which one of the strainers is mounted. This strainer is formed of upper and lower telescoping sections 1 and 2, respectively, each of the sections being formed with foraminous walls and the two sections coöperating with each other to provide a container within which the coffee is placed preparatory to inserting the strainer in the coffee pot. The strainer is shown as substantially cylindrical in shape, and the lower section 2 thereof is formed with spaced side walls $2^a$ providing an annular space within which the upper section 1 telescopes. A flat ring 3 is shown as extending around the bottom of the lower section 2 to strengthen and reinforce the same, and the side walls $2^a$ thereof are suitably secured to this flat ring 3 by means of suitable fastening strips 4. The upper edges of the side walls $2^a$ have binding strips 5 applied thereto, the binding strip of the inner wall being formed with an interior shoulder $5^a$, while the binding strip of the outer wall has a series of clamping bolts 6 extending through the same. The upper section 1 is provided at its lower edge with a binding strip 7 formed with a shoulder $7^a$ which coöperates with the shoulder $5^a$ of the binding strip 5 to limit the upward movement of the section 1. In a similar manner a binding strip 8 is applied to the upper edge of the section 1, said strip having a foraminous cover 9 hingedly connected thereto at 10. A suitable latch 11 is provided for securing the cover in a closed position, and a finger piece 12 is provided for manipulating the cover.

A series of slotted side bars 13 extend downwardly from the binding strip 8 and receive the outer ends of the clamping bolts 6. These slotted side bars are slidable up and down on the exterior of the lower section 2, and are adapted to be engaged by thumb nuts 14 on the bolts 6 to lock the two sections of the strainer in an adjusted position. When these nuts 14 are loosened the upper section 1 of the strainer can be moved up and down to adjust the size of the strainer and provide either a large or a small compartment, depending upon the quantity of coffee to be received therein. Owing to the fact that the upper section 1 telescopes in the annular space between the two side walls 2<sup>a</sup> of the lower section, it will be obvious that the sections can be adjusted without stirring up the grounds in the lower section, should it be desirable to lengthen the container to receive a quantity of coffee in addition to that already confined therein.

For the purpose of supporting the strainer in position within the coffee pot A, a series of supporting hooks B are provided, said hooks being hingedly connected at 15 to the top binding strip 8 of the upper section 1, and terminating at their free ends in claws 16 which are adapted to engage the upper edge of the coffee pot. These hooks B are extensible, being each formed of a pair of telescoping sections 17 and 18, one of the sections being longitudinally slotted at 19 and provided at opposite edges thereof with notches 20, while the opposite section is provided with a headed stud 21 which slides in the slot 19 of the first mentioned section, and also with a pair of lugs 22 which are adapted to interlock with selected notches 20. The lugs 22 are located on opposite sides of the stud 21 and at opposite edges of the strip, so that when the strip is swung into an angular position the lugs are disengaged from the notches 20, thereby enabling the stud 21 to be moved up and down within the slot 19, although when the strip is swung outwardly into operative position the lugs 22 are brought into engagement with selected notches 20, and the two sections 17 and 18 locked in an adjusted position. In this manner the effective length of the hooked supporting arms B can be adjusted to support the strainer at the desired elevation in the coffee pot, as well as to fit the particular coffee pot in connection with which the strainer is used. When this device is employed for the making of coffee the grounds are confined in such a manner that a clear cup of coffee can be poured from the pot at any time. This avoids the necessity of settling the coffee with cold water, or of tying the coffee in a muslin bag, the latter being very objectionable for the reason that it always imparts a disagreeable taste to the coffee, and the bag quickly becomes sour so that it may become a source of infection.

Having thus described the invention, what I claim as new and desire to secure by Letters Patent, is:—

1. A coffee strainer including a foraminous container formed of upper and lower telescoping sections, the lower sections being formed with double side walls providing an annular space for the reception of the upper section, means for clamping the lower section in an adjusted position upon the upper section, and supporting hangers extending upwardly from the upper section for engagement with the coffee pot.

2. A coffee strainer including a foraminous container formed of upper and lower telescoping sections, the lower section being constructed with double side walls providing an annular space for the reception of the upper section, one of the side walls carrying a stop shoulder, clamping screws projecting from the other side wall, a shoulder on the upper section for coöperation with the said stop shoulder to limit the telescoping movements of the sections, side bars extending downwardly from the upper section and adjustably engaging the clamping screws to lock the two sections in an adjusted position, and supporting hangers extending upwardly from the upper section for engaging with the coffee pot.

3. A coffee strainer including a foraminous container formed of upper and lower telescoping sections, the lower section being constructed with double side walls providing an annular space for the reception of the upper section, binding strips applied to the upper edges of the spaced side walls, one of the said binding strips being provided with a stop shoulder, clamping screws extending through the other binding strip, binding strips applied to the upper and lower edges of the upper section, the lower binding strip being provided with a shoulder for coöperation with the before mentioned stop shoulder to limit the telescoping movements of the sections, side bars projecting downwardly from the upper binding strip and engaging the clamping screws to lock the two sections in an adjusted position and supporting hangers extending upwardly from the said upper strip of the upper binding section for engagement with the coffee pot.

4. A coffee strainer including a foraminous container, and a series of hooked supporting arms extending upwardly from the periphery of the container and formed of sections having both a pivotal and a sliding connection, one of the sections being provided with a series of notches while the other section is provided with a stud adapted to enter a selected one of the notches to lock the sections against sliding movement when they are swung into alinement with each other.

5. A coffee strainer including a foraminous receptacle formed of upper and lower telescoping sections, clamping screws projecting from one of the sections, side bars carried by the opposite section and engaging the clamping screws to lock the two sections in an adjusted position, and a series of hooked supporting arms extending upwardly from the periphery of the upper section and formed in adjustably connected sections so that the effective length thereof is adjustable.

In testimony whereof I have signed my name to this specification in the presence of two subscribing witnesses.

SAMUEL EDWIN HOLT.

Witnesses:
BENINÓ ZAMORA,
W. W. RUTHERFORD.

Copies of this patent may be obtained for five cents each, by addressing the "Commissioner of Patents, Washington, D. C."